(12) United States Patent
Myers et al.

(10) Patent No.: US 9,880,059 B2
(45) Date of Patent: Jan. 30, 2018

(54) GAS TURBINE EXHAUST DIFFUSER MOUNTED BLADE PATH THERMOCOUPLE PROBE

(71) Applicant: Siemens Energy, Inc., Orlando, FL (US)

(72) Inventors: Gerald A. Myers, Fort Mill, SC (US); John Giaimo, Palm Beach Gardens, FL (US); James Buttice, Jupiter, FL (US); Stephen Brooks, Jupiter, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 680 days.

(21) Appl. No.: 14/732,972

(22) Filed: Jun. 8, 2015

(65) Prior Publication Data

US 2016/0356174 A1   Dec. 8, 2016

(51) Int. Cl.
*G01K 1/14* (2006.01)
*F01D 17/08* (2006.01)
*G01K 13/02* (2006.01)

(52) U.S. Cl.
CPC ............. *G01K 1/14* (2013.01); *F01D 17/085* (2013.01); *F05D 2260/83* (2013.01); *G01K 2013/024* (2013.01)

(58) Field of Classification Search
CPC . F01D 21/003; F01D 5/02; F01D 5/12; F01D 25/00; F01D 17/085; F05D 2260/80; F05D 2260/83; F05D 2270/804; F05D 2270/808; F05D 2230/72; F05D 2240/60; F05D 2240/61; G01K 1/14; G01K 2013/024
See application file for complete search history.

*Primary Examiner* — Gregory Anderson
*Assistant Examiner* — Danielle M Christensen

(57) ABSTRACT

A thermocouple probe assembly for monitoring the temperature of an exhaust gas flow at an output of a gas turbine engine. The probe assembly includes a plenum pipe positioned within an opening extending through an outer casing wall and a plenum plate of the engine, where an air gap is provided between the casing wall and the plate. The plenum pipe is rigidly secured to the plenum plate and resiliently mounted to the casing wall so that the plenum pipe is operable to slide relative to the wall. The probe assembly further includes a diffuser liner boss rigidly secured to an outer liner of an exhaust gas diffuser in the gas turbine engine, where the liner boss includes a central bore, and where the shaft of the thermocouple probe extends through the central bore in the liner boss so that the sensor is positioned within the exhaust gas diffuser.

18 Claims, 3 Drawing Sheets

GAS TURBINE EXHAUST DIFFUSER MOUNTED BLADE PATH THERMOCOUPLE PROBE

BACKGROUND OF THE INVENTION

Field of the Invention

This invention relates generally to a thermocouple probe positioned to extend into and measure the temperature of the exhaust gas flow of a gas turbine engine and, more particularly, to a thermocouple probe assembly including a thermocouple probe positioned to extend into and measure the temperature of the exhaust gas flow of a gas turbine engine, where the probe assembly includes a liner boss that secures the probe to an outer liner associated with an exhaust gas diffuser and includes a plenum pipe through which the probe extends and that seals an airflow plenum between a turbine casing and a plenum wall.

Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across turbine blades therein by associated vanes. As the working gas passes through the turbine section, it causes the blades to rotate, which in turn causes a shaft to rotate, thereby providing mechanical work.

The turbine section of a typical gas turbine engine includes a plurality of rows of circumferentially disposed blades, such as four rows of blades, where the working gas is directed by a row of vanes across the blades from one stage of the blades to the next stage of the blades. At the output of the turbine section, the working gas passes through an exhaust gas diffuser that recovers the dynamic head of the exhaust gas for optimal performance of the turbine section. The exhaust gas, which is still very hot, is often times directed to other systems that may benefit from the available heat until the working gas is eventually exhausted to the environment or otherwise. For example, the hot exhaust gas at the output of the gas turbine engine may be used to boil water for a steam turbine, which also generates power in, for example, a combined cycle plant, well known to those skilled in the art. The configuration of the exhaust gas diffuser at the output of the gas turbine engine is important for the performance of the gas turbine blades because the exhaust gas diffuser partially blocks the gas flow from the turbine section.

It is necessary to provide thermocouple temperature probes, or other temperature sensing devices, that extend into the hot exhaust gas path downstream of the turbine blades to measure the temperature of the exhaust gas and ensure that the engine combustors are operating properly, where a separate thermocouple probe is generally provided for each engine combustor. For example, the temperature measured by the thermocouple probes are compared to each other to make sure that any one or more of the combustors is providing the same temperature gas as the other combustors. In order to perform properly, the thermocouple probe sensor needs to be positioned at a specific location within the hot exhaust gas flow, which often presents substantial difficulties for probe design depending on the architecture of the turbine engine. Particularly, the configuration and components of the turbine section and exhaust gas diffuser often limit packaging and access for mounting the thermocouple probe, and may require sealing around the probe to prevent airflow leaks. High temperatures inherent within the turbine section of the engine push materials to their limits and also create large thermal growth differences between casing walls and other components. Vibrations and the constant loading caused by the hot exhaust gas flow also create a considerable amount of stress and fatigue. Further, the thermocouple probe must be designed so that all thermocouple probes remain operable to continuously monitor combustor operation during an entire service interval without maintenance.

Conventional thermocouple probes for gas turbine engines are generally rigidly mounted to the turbine casing where the probe extends through a hole in the outer liner of the exhaust gas diffuser and into the hot exhaust gas path. Modern gas turbine engine designs sometimes include an air plenum for providing cooling air to various turbine section components that is located at the position where the temperature of the exhaust gas needs to be monitored. These designs often require complex static, sometimes dynamic, seals to seal the hot exhaust gas from leaking into the engine enclosure. However, these seals are highly susceptible to wear given the temperatures, vibrations and thermal movement of the casings and/or the thermocouple probe. One thermocouple probe design for these modern engines includes a long thermocouple wire fed into a tube extending out of the back of the exhaust gas diffuser. However, these types of routed designs of thermocouple probes can be vulnerable to assembly and service issues as damaged parts inside the tube cannot be easily replaced.

SUMMARY OF THE INVENTION

The present disclosure describes a thermocouple probe assembly for monitoring the temperature of an exhaust gas flow at an output of a gas turbine engine. The probe assembly includes a thermocouple probe having a probe shaft, a thermocouple sensor mounted at a sensing end of the shaft, an electrical connector mounted at an opposite end of the shaft from the sensor, and a guide pipe through which the shaft extends that is mounted to the shaft between the sensor and the connector. The probe assembly also includes a plenum pipe operable to be positioned within an opening extending through an outer casing wall and a plenum plate of the engine, where an air plenum is provided between the casing wall and the plate. The plenum pipe is rigidly secured to the plenum plate and resiliently mounted to the casing wall so that the plenum pipe is operable to slide relative to the wall, where the probe shaft and guide pipe extend through the plenum pipe and are spaced therefrom. The probe assembly further includes a diffusion liner boss that is rigidly secured to an outer liner of an exhaust gas diffuser in the gas turbine engine, where the liner boss includes a central bore, and where the shaft of the thermocouple probe extends through the central bore in the liner boss so that the sensor is positioned within the exhaust gas diffuser, and the guide pipe is rigidly secured to the liner boss.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a thermocouple probe assembly for monitoring the temperature of an exhaust gas flow in a gas turbine engine is merely exemplary in nature, and is in no way intended to limit the invention or its applications or uses. For example, the thermocouple probe assembly has specific application for a gas turbine engine. However, the thermocouple probe assembly may have application for other types of engines.

Figure 1:
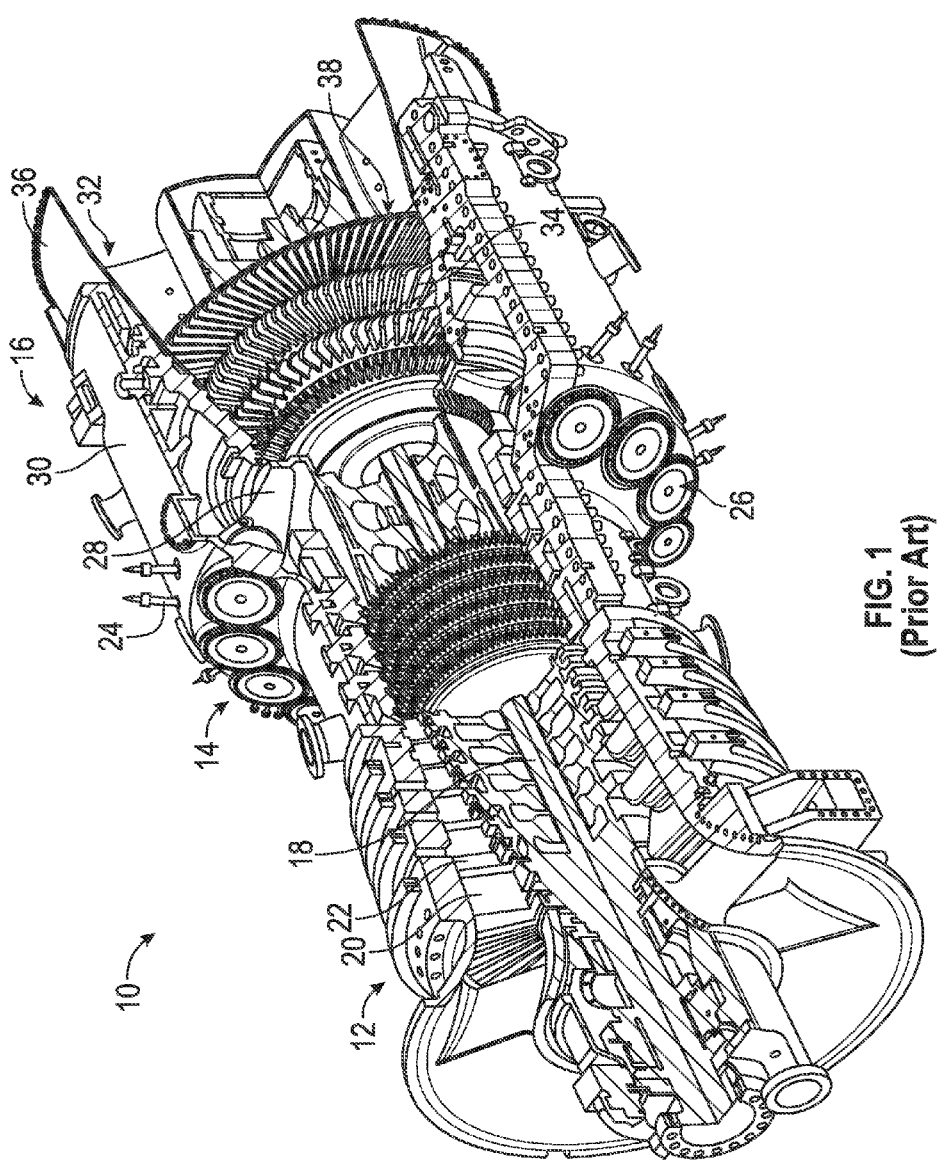
FIG. 1 is a cut-away, isometric view of a known gas turbine engine.

FIG. 1 is a cut-away, isometric view of a known gas turbine engine 10 including a compressor section 12, a combustion section 14 and a turbine section 16 all enclosed within an outer housing or casing 30, where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16. The working gas is then directed by circumferentially disposed stationary vanes (not shown) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output section generally including an exhaust gas diffuser 32 having an outer liner 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receives the highest temperature of the working gas, where the temperature of the working gas decreases as it flows through the turbine section 16.

Figure 2:
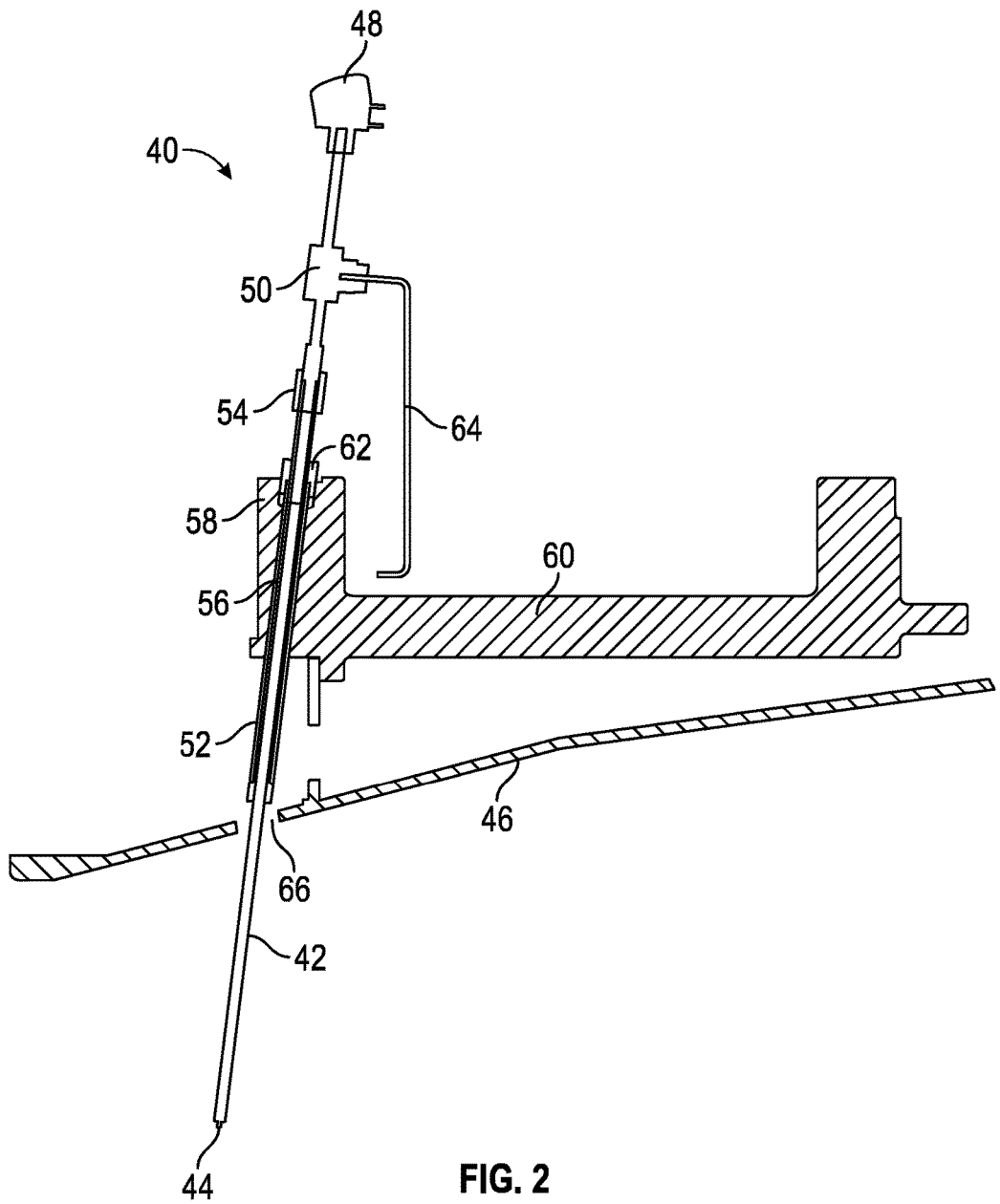
FIG. 2 is a side view of a known thermocouple probe mounted to a outer casing of a gas turbine engine and extending through an opening in an exhaust gas diffuser liner.

FIG. 2 is a side view of a known thermocouple probe 40 including a probe shaft 42 having a thermocouple sensor 44 at a tip of the shaft 42, where the sensor 44 is positioned to monitor the temperature of the exhaust gas flowing from the turbine section of a gas turbine engine through an exhaust gas diffuser having an outer liner 46. An electrical connector 48 is provided at an end of the shaft 42 opposite to the sensor 44 and a pipe connector 50 is coupled to the shaft 42 proximate the connector 48, where the electrical connector 48 provides an electrical connection to the sensor 44 through the shaft 42. The shaft 42 of the probe 40 extends through an outer sleeve 52 and is secured thereto by a coupler 54. The sleeve 52 is positioned within an opening 56 in an edge flange 58 that is part of an outer casing 60 of the turbine engine and is secured thereto by a nut 62. A bent tube 64 is coupled to the connector 50 and is positioned relative to the flange 58. The shaft 42 extends from the sleeve 52 and through an opening 66 in the outer liner 46 of the exhaust gas diffuser. The size of the opening 66 is selected so that thermal expansion of the liner 46 allows it to move relative to the probe 40 without putting stress on the probe 40. The probe 40 is angled as shown so that it can be rigidly mounted to the casing 60 and the sensor 44 is positioned at the exact location in the exhaust flow that is necessary.

As mentioned above, the thermocouple probe 40 needs to be located at a specific location in the exhaust gas flow in order to properly monitor its temperature. In one or more current gas turbine engine designs, the location outside of the exhaust gas diffuser where the known thermocouple probe would need to be positioned for that location includes an airflow plenum through which cooling air flows to provide cooling to various turbine section components. The present invention proposes redesigning the conventional thermocouple probe as an assembly of thermocouple probe parts that allow the thermocouple probe to extend through the plenum and allow the plenum to be properly sealed to prevent airflow leaks and also account for significant thermal mismatch between the outer casing and the exhaust gas diffuser.

Figure 3:
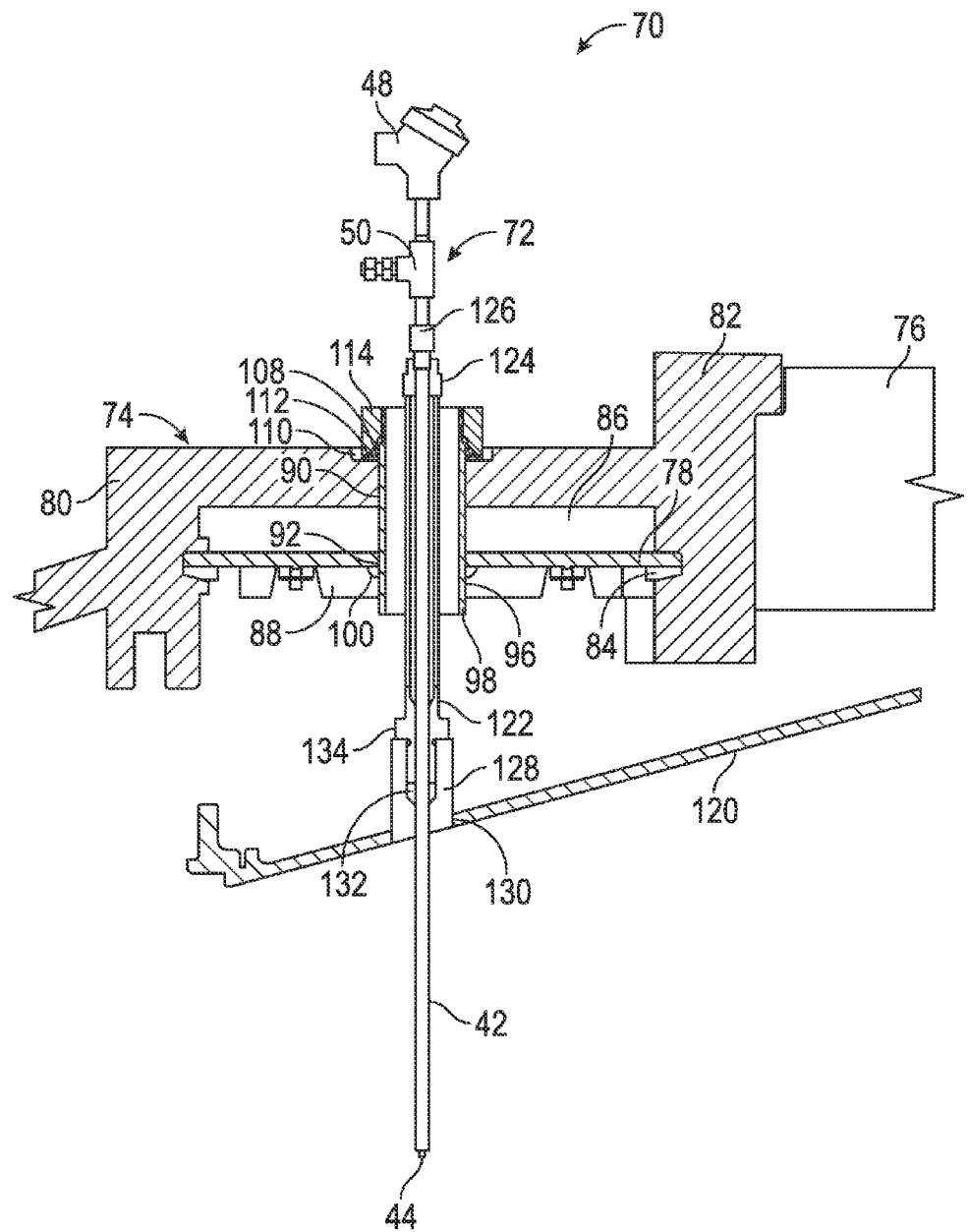
FIG. 3 is a side view of a thermocouple probe assembly mounted to an exhaust gas diffuser liner in a gas turbine engine and extending through an outer turbine casing and an airflow plenum in a sealed manner.

FIG. 3 is a side view of a thermocouple probe assembly 70 including a thermocouple probe 72 similar to the probe 40, where like elements are identified by the same reference number. As will be discussed in detail below, the probe assembly 70 is designed to mount the probe 72 to the turbine engine in a manner that allows thermal expansion between turbine engine components and positions the sensor 44 at the necessary location. For example, in this non-limiting design the turbine engine includes an outer casing 74 shown broken away and being attached to an exhaust gas diffuser support structure 76. A plenum plate 78 is mounted to opposing flanges 80 and 82 of the outer casing 74 by wedges 84 so as to define an air plenum 86 between the casing 74 and the plate 78. Further, an insulation layer 88 is bolted to the plate 78 opposite to the plenum 86.

As will be discussed in detail below, the probe 72 extends through the casing 74 in a manner that allows the plenum 86 to be sealed from air leaks and also allows movement of the probe 72 for thermal expansion purposes. Particularly, a hole 90 is drilled through the outer casing 74, a hole 92 is drilled through the plate 78 and in alignment with the hole 90 and a hole 96 is provided through the insulation layer 88 aligned with the hole 92 in the plate 78. A metal plenum pipe 98 of a suitable length is then inserted through the holes 90, 92 and 94, and is welded to the plate 78 at, for example, weld line 100 to define a channel through the casing 74, the plate 78 and the insulation layer 88. The pipe 98 is positioned against the hole 90 in the casing 74 so that when the engine gets hot and the casing 74 and the plate 78 thermally expand differently in response thereto, the pipe 98 is able to slide relative to the casing 74 and allow for thermal expansion. An O-ring 108 is provided in an annular chamber 110 around the pipe 98 and a nut 114 is threaded onto an end of the pipe 98 and is positioned to hold the O-ring 108 in place, where a washer 112 is provided below the O-ring 108 to prevent the O-ring 108 from getting wedged between the plenum pipe 98 and the hole 90 during assembly. In this configuration, the O-ring 108 allows for thermal expansion of the pipe 98 and seals the plenum 86.

As discussed above, the thermocouple probe 40 is rigidly mounted to the casing 62 and slidably inserted through the opening 66 in the liner 46, which allows the probe 40 to move relative thereto. Contrary, for the probe assembly 70 as discussed herein, the probe 72 is movably positioned within the pipe 98 and is rigidly mounted to an outer liner 120 of an exhaust gas diffuser. Also in the probe assembly 70, the sleeve 52 is replaced with a guide pipe 122 having a threaded end 124 that engages a coupler 126 mounted to the shaft 42 to secure the probe 72 to the guide pipe 122. The probe assembly 70 also includes a liner boss 128 that is rigidly secured within an opening 130 in the liner 120 by welding or the like and includes a central bore 132 extending therethrough. A threaded end piece 134 of the guide pipe 122 is threaded into a threaded portion of the bore 132 to rigidly secure the probe 72 to the liner 120. The probe shaft 42 extends through the bore 132 in the liner boss 128 so that the sensor 44 is positioned at the desired location. When the liner 120 thermally expands, which causes the probe 72 to move forward and backwards, the probe 72 is able to move relative to the casing 74 within the plenum pipe 98.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A thermocouple probe assembly for monitoring temperature of an exhaust gas flow at an output of a gas turbine engine, said thermocouple probe assembly comprising:
    a thermocouple probe including a probe shaft, a thermocouple sensor provided at a sensing end of the probe shaft, an electrical connector provided at an opposite end of the probe shaft from the thermocouple sensor and a guide pipe through which the probe shaft extends and being mounted to the probe shaft between the thermocouple sensor and the electrical connector;
    a plenum pipe operable to be positioned within an opening extending through an outer casing wall and a plenum plate, where an air gap is provided between the outer casing wall and the plenum plate, said plenum pipe being rigidly secured to the plenum plate and resiliently mounted to the outer casing wall so that the plenum pipe is operable to move relative to the outer casing wall, said probe shaft and guide pipe extending through the plenum pipe and being spaced therefrom; and
    a liner boss operable to be rigidly secured to an outer diffuser liner of an exhaust gas diffuser in the gas turbine engine, said liner boss including a central bore, wherein the probe shaft of the thermocouple probe extends through the central bore in the liner boss so that the thermocouple sensor is positioned within the exhaust gas diffuser, and wherein the guide pipe is rigidly secured to the liner boss.

2. The thermocouple probe assembly according to claim 1 wherein the plenum pipe is welded to the plenum plate and the liner boss is welded to the outer diffuser liner.

3. The thermocouple probe assembly according to claim 1 wherein the plenum pipe is resiliently mounted to the outer casing wall by an O-ring.

4. The thermocouple probe assembly according to claim 1 wherein the guide pipe is rigidly secured to the liner boss by a threaded connection.

5. The thermocouple probe assembly according to claim 1 wherein the guide pipe is rigidly secured to the probe shaft by a threaded connection.

6. A sensor probe assembly for monitoring temperature of an exhaust gas flow at an output of a gas turbine engine, said probe assembly comprising:
    a sensor probe including a probe shaft and a sensor provided at a sensing end of the probe shaft;
    a plenum pipe operable to be positioned within an opening extending through an outer casing wall and a plenum plate, where an air gap is provided between the outer casing wall and the plenum plate, said plenum pipe being rigidly secured to the plenum plate wall and resiliently mounted to the the outer casing wall; and
    a liner boss operable to be rigidly secured to an outer diffuser liner of an exhaust gas diffuser in the gas turbine engine, said liner boss including a central bore, wherein the probe shaft of the thermocouple probe extends through the central bore in the liner boss so that the sensor probe is positioned within the exhaust gas diffuser.

7. The sensor probe assembly according to claim 6 wherein the plenum pipe is rigidly secured to the plenum plate and resiliently mounted to the outer casing wall so that the plenum pipe is operable to slide relative to the wall.

8. The sensor probe assembly according to claim 7 wherein the plenum pipe is resiliently mounted to the outer casing wall by an O-ring.

9. The sensor probe assembly according to claim 6 wherein the sensor probe includes a guide pipe through which the probe shaft extends, and wherein the probe shaft and the guide pipe extend through the plenum pipe and are spaced therefrom.

10. The sensor probe assembly according to claim 9 wherein the guide pipe is rigidly secured to the liner boss by a threaded connection.

11. The sensor probe assembly according to claim 9 wherein the guide pipe is rigidly secured to the probe shaft by a threaded connection.

12. The sensor probe assembly according to claim 6 where the sensor probe is a thermocouple probe.

13. The sensor probe assembly according to claim 6 wherein the plenum pipe is welded to the plenum plate and the liner boss is welded to the outer diffuser liner.

14. A method for mounting a thermocouple probe in an output of a gas turbine engine so as to monitor temperature of an exhaust gas flow, said probe including a probe shaft, a thermocouple sensor mounted at a sensing end of the probe shaft, an electrical connector mounted at an opposite end of the probe shaft from the thermocouple sensor and a guide pipe through which the probe shaft extends and being mounted to the probe shaft between the thermocouple sensor and the electrical connector, said method comprising:

positioning a plenum pipe within an opening extending through an outer casing wall of the engine and a plenum plate, where an air gap is provided between the outer casing wall and the plenum plate, so that the plenum pipe is rigidly secured to the plenum plate and resiliently mounted to the outer casing wall so that the plenum pipe is operable to move relative to the outer wall, said probe shaft and guide pipe extending through the plenum pipe and being spaced therefrom;

rigidly securing a diffusion liner boss to an exhaust gas diffuser liner of an exhaust gas diffuser in the gas turbine engine, said diffusion liner boss including a central bore; and inserting the thermocouple probe through the plenum pipe so that it is spaced therefrom, rigidly securing the guide pipe to the diffusion liner boss and inserting the probe pipe through the central bore in the diffusion liner boss so that the thermocouple sensor is positioned within the exhaust gas diffuser.

15. The method according to claim 14 wherein the plenum pipe is welded to the plenum plate and the diffusion liner boss is welded to the exhaust gas diffuser liner.

16. The method according to claim 14 wherein the plenum pipe is resiliently mounted to the outer casing wall by an O-ring.

17. The method according to claim 14 wherein the guide pipe is rigidly secured to the diffusion liner boss by a threaded connection.

18. The method according to claim 14 wherein the guide pipe is rigidly secured to the probe shaft by a threaded connection.

* * * * *